United States Patent Office 3,525,401
Patented Aug. 25, 1970

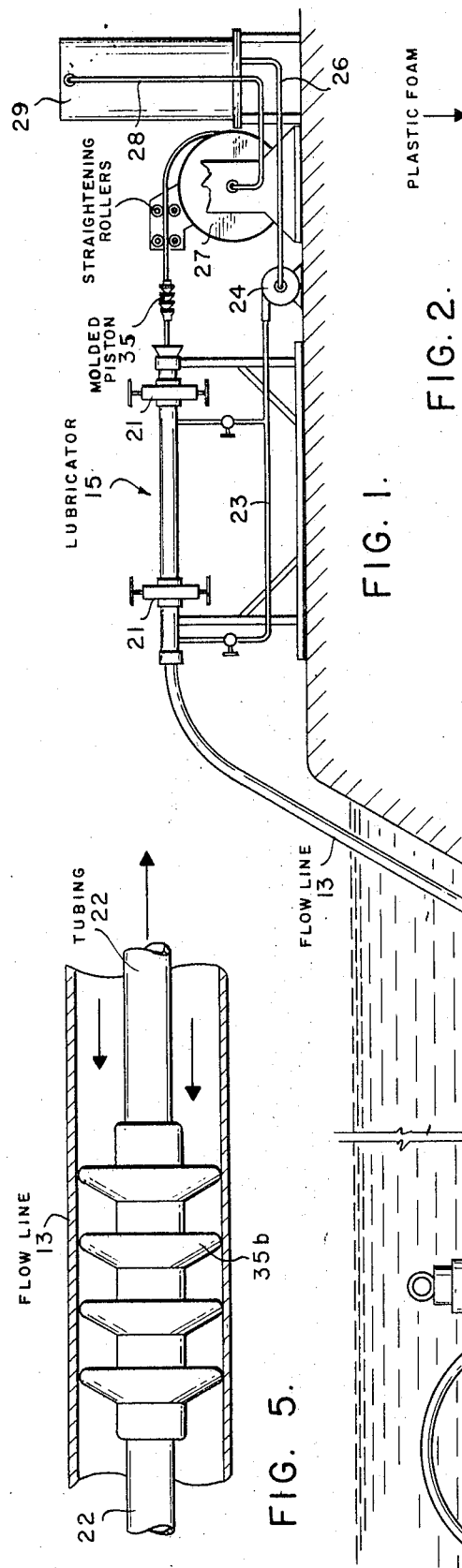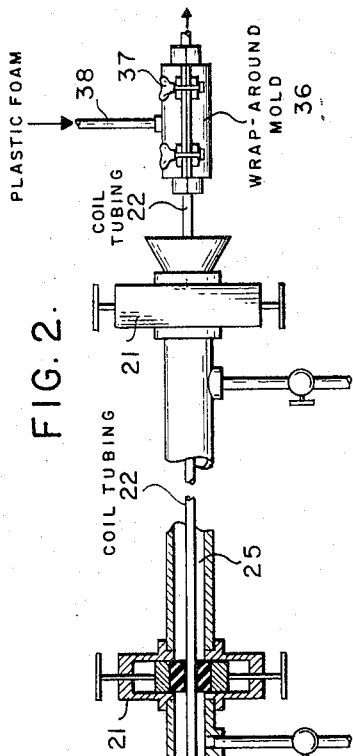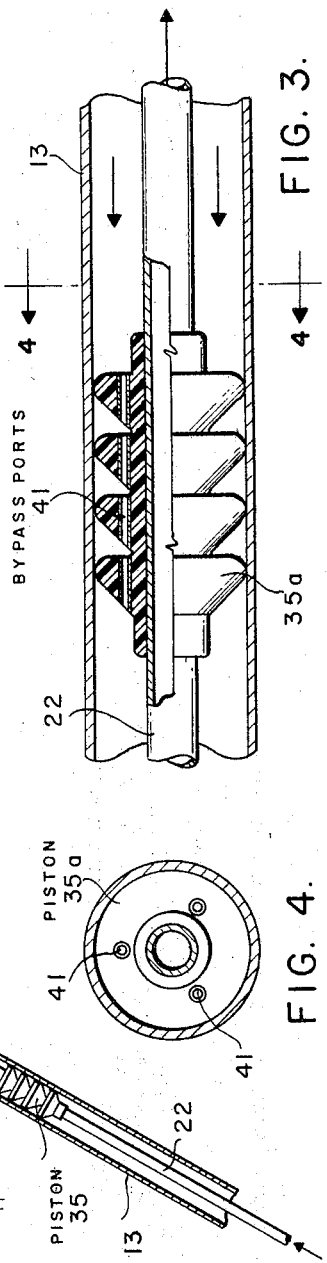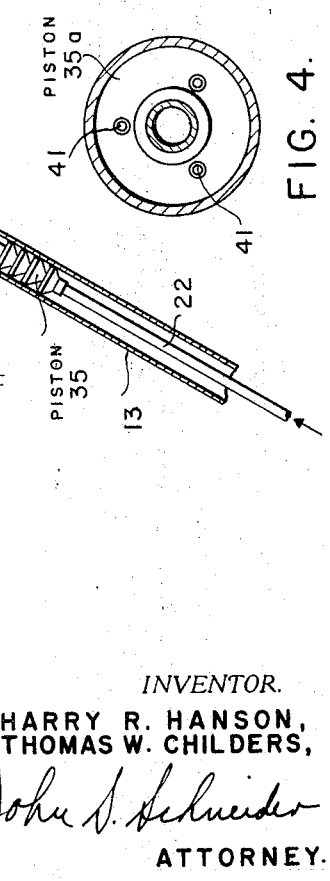

3,525,401
PUMPABLE PLASTIC PISTONS AND THEIR USE
Harry R. Hanson, Jefferson Parish, La., and Thomas W. Childers, Los Angeles County, Calif., assignors to Esso Production Research Company, a corporation of Delaware
Filed Aug. 12, 1968, Ser. No. 751,894
Int. Cl. B29f 1/10; E21b 19/08, 33/124
U.S. Cl. 166—315
8 Claims

ABSTRACT OF THE DISCLOSURE

A method for forming a pumpable plastic piston on equipment to be pumped through either a surface or well conduit. The plastic piston is shaped and bonded to such equipment at the pumping site. It is shaped so that an outer surface of the piston sealingly engages the inner wall surface of the conduit (or a sufficient closure of the conduit is achieved to permit the piston to be pumped through the conduit). The plastic, when set or hardened, has sufficient flexibility to traverse bends and curves in the conduit. After the piston is formed and attached to the pumpable equipment, that equipment and the piston are pumped through the conduit.

BACKGROUND OF THE INVENTION

Field of the invention

The present invention concerns pumpable plastic pistons or locomotive devices used to transport equipment through a conduit or pipeline to a remote location. This invention also concerns the process involved in molding such plastic pistons onto the equipment to be pumped through a conduit. The present invention further concerns the method of pumping these plastic pistons and the equipment to which they are attached through a conduit.

Description of the prior art

Pumpable pistons used to transport tools and other equipment through a conduit preferably have seals on their outer edges which are actuated by fluid pressure to cause the seals to engage and seal against the inner wall of the conduit. In certain applications, these pistons are provided with bypass passageways which permit fluid to flow through the pistons to power other pistons which are arranged in series on the equipment being pumped through the conduit. In one particular application, coiled tubing is propelled by these pistons into the underwater system of underwater wells. The pistons are concentrically arranged on the coiled tubing at intervals to help transport the tubing through flow lines and down the well under the application of surface pump pressure. A typical operation of this nature is shown and described in U.S. Pat. No. 3,346,045 entitled, "Operation in a Submarine Well," by R. P. Knapp et al. Spring seals and internal ports of these and other such pumpable pistons are easily clogged by paraffin, sand and other debris and are subject to early failure. Failure of these pistons prevents retrieving coiled tubing or other equipment with which these pistons are used from the well. Further, these pistons are cumbersome to handle.

SUMMARY OF THE INVENTION

The disadvantages in the use of prior art pumpable pistons described above are overcome or minimized by the present invention which comprises a plastic piston molded to a desired shape and bonded to equipment pumpable through a conduit. The conduit may be well pipe, surface line pipe or other type of conduit installation. The pumpable equipment may be well tools or flexible well tubings or electrical conductor cables, etc.

The present invention also encompasses the method of transporting a plastic piston and the equipment to which the piston has been attached through a conduit to a remote location.

The term "plastic" as used herein applies to materials which can be shaped and then hardened and which are capable of bonding to the equipment to be pumped. Such materials may be thermoplastic or thermosetting.

A primary object of the present invention is to provide improved method and apparatus for pumping equipment through a conduit and in particular an improved piston for use in pumping such equipment.

The above object and other objects of the invention will be apparent from a more detailed description thereof taken with the drawings attached hereto.

BRIEF DESCRIPTION OF THE DRAWINGS

FIGS. 1 and 2 are schematic views illustrating a well completed in a body of water and a curved conduit and the manner of running a flexible tubing into the well;

FIG. 3 is an enlarged view of one embodiment of the pumpable piston of the invention;

FIG. 4 is a view taken on lines 4—4 of FIG. 3; and

FIG. 5 is an enlarged view of another embodiment of the pumpable piston of the invention.

DESCRIPTION OF THE PREFERRED EMBODIMENT

Referring to the drawings, there is shown in FIGS. 1 and 2 a wellhead 10 located on the ocean floor 11 beneath a body of water 12. A flow line 13 connects at its submerged end to well pipe (not shown) in wellhead 10 and at its other end to a surface lubricator manifold 15 on which is arranged full opening packoff seal equipment 21 adapted, when closed, to seal off the space 25 between the outer wall of a coiled tubing 22 arranged in lubricator 15 and the inner wall thereof. A conduit 23 provided with suitable valves connects a pump 24 to the space 25 surrounding coiled tubing 22 in lubricator 15. Pump 24 is connected to a source of fluid 29 by means of a conduit 26.

Coiled tubing 22 is arranged on and fed from a reel 27 to which tank 29 is connected by means of a conduit 28. Straightening rollers 30 may be used to straighten tubing 22. The continuous length of tubing 22 is constructed of substantially rigid, small diameter pipe having sufficient flexibility to allow it to traverse bends and curves in flow line 13.

Plastic pistons 35 are molded onto coiled tubing 22 at desired spaced-apart intervals. As illustrated in FIG. 2, when it is desired to mold a piston onto coiled tubing 22, a wrap-around mold 36 formed in a desired piston shape is clamped by means of clamps 37 to the coiled tubing and a suitable moldable material is poured or squeezed into the mold through the connection 38 arranged thereon. The material is then permitted to set or harden in the mold. Although not shown, the mold may be designed for heating of the plastic material within the mold to facilitate formation of the piston. Once the material has set, mold 36 is removed. For ease in placement on and removal from the coiled tubing, mold 36 is formed of hinged half-sections which are of the desired size and shape for coiled tubing 22. It may be made of nondisposable-type metals or disposable paper products. Mold 36 is placed about coiled tubing 22 just before it enters the launch manifold 15. The plastic material adheres to tubing 22 and eliminates any need for a mechanical connection. The mold may be made in various lengths to increase its sealing efficiency.

In operation, tubing 22 with its free end inserted in flow line 13 is propelled therethrough by pumping fluid from tank 29 into flow line 13 through lines 26, 23 by means of pump 24. The pumped fluid acts against piston 35 as indicated by the arrows in the figures and causes pipe 22 to be propelled through flow line 13 and into the offshore wellhead 10. Fluid in flow line 13 is displaced up through tubing 22, as indicated by the arrows in the figures, and through conduit 28 into tank 29.

Alternately, as illustrated in FIGS. 3 and 4, molded piston 35a may be provided with bypass ports 41 to permit pumped fluid to bypass the plastic piston attached to tubing 22. These bypass ports may be formed by inserting small diameter plastic or aluminum tubing in mold 36. In that manner, the plastic piston is provided with bypass ports at the location of such tubings.

As shown in FIG. 5, the thin lips 42 of the molded plastic piston 35b may serve as a differential pressure limitor in the same manner that the aforementioned bypass ports function as differential pressure limitors. Lips 42 of piston 35b will deform under pressure and permit fluid to bypass them to act on subsequent pistons.

The material used to form the plastic pistons may suitably be readily available plastic foams such as polyurethane or epoxy foam plastics formed by combining two liquid chemical reactants. Plastics of this type are easily handled and form in a few minutes following mixing of the desired ingredients. Other examples of moldable materials which might be used to form the piston include plastics such as polypropylenes, polyethylenes, e.g., polytetrafluoroethylene, nitriles, fluorocarbons, silicons, phenolics, neoprene and butyl rubbers.

Various changes may be made in the embodiments of the invention described herein without departing from the spirit and scope of the invention. The piston may be molded onto well tools such as sand washing tools instead of onto coiled tubing, and the piston may be molded onto electrical conducting cables or other lines for use in threading such liens through either a surface or subsurface conduit.

Having fully described the nature, objects, advantages, method and apparatus of our invention, we claim:

1. A method for pumping flexible tubing through a conduit comprising:
   (1) molding a first plastic piston directly onto the exterior of said flexible tubing;
   (2) inserting said first plastic piston into said conduit;
   (3) applying fluid pressure against said first plastic piston to move said tubing and attached first plastic piston through said conduit;
   (4) molding a second plastic piston directly onto the exterior of said flexible tubing;
   (5) inserting said second plastic piston into said conduit;
   (6) applying fluid pressure against said second plastic piston to move said tubing and attached second plastic piston through said conduit; and
   (7) repeating the aforementioned steps (1)–(3) for third and more plastic pistons.

2. A method for forming pumpable pistons on flexible tubing adapted to be pumped through a well pipe arranged in a well comprising:
   placing a mold on said flexible tubing;
   introducing plastic material into said mold;
   permitting said plastic material to harden to mold a plastic piston onto the exterior of said flexible tubing;
   removing said mold from said piston and said flexible tubing, said piston being shaped to close the annulus between the inner wall of said well pipe and said piston sufficiently to permit said piston to be pumped through said well pipe upon application of fluid pressure thereto; and
   repeating said above steps to mold a plurality of said plastic pistons directly onto the exterior of said flexible tubing at spaced-apart intervals.

3. A method as recited in claim 2 in which each molded plastic piston includes at least one sealing outer surface adapted to engage the inner wall of said well pipe, at least one of said pistons having a bypass port therethrough.

4. A method as recited in claim 2 in which each molded plastic piston includes at least one sealing outer surface adapted to engage the inner wall of said well pipe, said outer sealing surface being deformable upon the application of fluid pressure thereto.

5. A method for forming pumpable plastic pistons on flexible tubing adapted to be pumped through a flow line extending between a surface site and a subsurface well pipe comprising:
   placing a mold on said flexible tubing;
   introducing plastic material into said mold;
   permitting said plastic material to harden to mold a plastic piston onto the exterior of said flexible tubing;
   removing said mold from said piston and said flexible tubing, said piston being shaped to close the annulus between the inner wall of said flow line and said piston sufficiently to permit said piston to be pumped through said flow line upon application of fluid pressure thereto; and
   repeating said above steps to mold a plurality of said plastic pistons directly onto the exterior of said flexible tubing at spaced-apart intervals.

6. A method as recited in claim 5 in which each molded plastic piston includes at least one sealing outer surface adapted to engage the inner wall of said flow line, at least one of said pistons having a bypass port therethrough.

7. A method as recited in claim 5 in which each molded plastic piston includes at least one sealing outer surface adapted to engage the inner wall of said flow line, said outer sealing surface being deformable upon the application of fluid pressure thereto.

8. A method for pumping flexible tubing through a conduit comprising:
   (1) molding a plastic piston directly onto the exterior of said flexible tubing;
   (2) inserting said piston into said conduit;
   (3) applying fluid pressure against said piston to move said tubing and attached piston through said conduit; and
   (4) repeating the aforementioned steps (1), (2), and (3) for a second plastic piston.

References Cited

UNITED STATES PATENTS

| | | |
|---|---|---|
| 1,531,437 | 3/1925 | Havenith et al. _____ 264—279 |
| 2,633,808 | 4/1953 | Webber. |
| 3,049,382 | 8/1962 | Ell. |
| 3,055,424 | 9/1962 | Allen _____ 166—315 X |
| 3,064,731 | 11/1962 | Hall _____ 166—202 X |
| 3,159,219 | 12/1964 | Scott _____ 166—156 |
| 3,226,463 | 12/1965 | Wallace _____ 264—275 X |
| 3,346,045 | 10/1967 | Knapp et al. _____ 166—315 X |
| 3,373,816 | 3/1968 | Cochran _____ 166—315 X |
| 3,394,760 | 7/1968 | Childers et al. _____ 166—315 |

ERNEST R. PURSER, Primary Examiner

I. A. CALVERT, Assistant Examiner

U.S. Cl. X.R.

166—153, 191; 264—275, 279